United States Patent [19]

Lifka

[11] Patent Number: 5,014,508

[45] Date of Patent: May 14, 1991

[54] COMBINATION PROPULSION SYSTEM FOR A FLYING CRAFT

[75] Inventor: Hans Lifka, Kochel, Fed. Rep. of Germany

[73] Assignee: Messerschmitt-Boelkow-Blohm GmbH, Munich, Fed. Rep. of Germany

[21] Appl. No.: 494,990

[22] Filed: Mar. 16, 1990

[30] Foreign Application Priority Data

Mar. 18, 1989 [DE] Fed. Rep. of Germany ....... 3909050

[51] Int. Cl.$^5$ .......................... F02K 9/78; F02K 9/48; F02K 3/02
[52] U.S. Cl. ........................ 60/224; 60/246; 60/268; 60/270.1
[58] Field of Search ................. 60/246, 245, 224, 225, 60/270.1, 244, 247, 268, 39.43, 39.78

[56] References Cited

U.S. PATENT DOCUMENTS

| | | | |
|---|---|---|---|
| 2,995,893 | 8/1961 | Morris et al. | 60/246 |
| 3,635,577 | 1/1972 | Dee | 415/79 |
| 3,818,695 | 6/1974 | Rylewski | 415/79 |

FOREIGN PATENT DOCUMENTS 3617915 9/1987 Fed. Rep. of Germany.
3738703 11/1987 Fed. Rep. of Germany.

Primary Examiner—Louis J. Casaregola
Assistant Examiner—Laleh Jalali
Attorney, Agent, or Firm—W. G. Fasse

[57] ABSTRACT

A combination engine for a flying craft capable of flying at speeds within a wide range from subsonic speeds to hypersonic speeds, is equipped with a rocket engine section that is independent of an atmospheric air supply, and a turbo air jet engine section having a compressor which is driven by a turbine that is also independent of an external air supply. The combination may further include extra fuel supply nozzles for operation as a ram jet which uses the same flow channel as the turbo air jet engine section. A gas generator equipped with two valving mechanisms is arranged coaxially with the rocket engine section. The valving mechanisms are controllable to open the gas generator chamber to the rocket combustion chamber while closing off gas flow to the turbo air jet section or vice versa. Either section can work alone or in parallel and simultaneously with the other section. Each turbine wheel forms with one compressor wheel a free wheeling rotor without any intermediate guide wheels, whereby the turbine blades extend either radially inwardly or radially outside of the compressor blades. A gas mixer or distributor is arranged downstream of the turbine and leads into the combustion chamber of the turbo or ram jet section to mix external air with the turbine propellant gases.

11 Claims, 7 Drawing Sheets

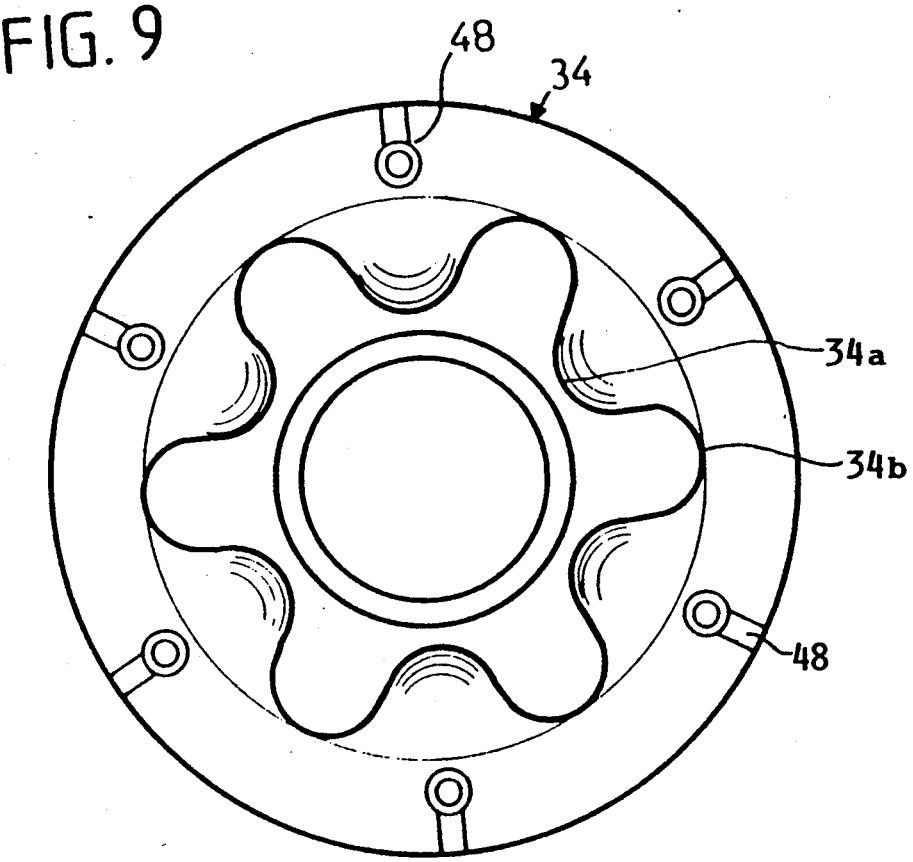

COMBINATION PROPULSION SYSTEM FOR A FLYING CRAFT

FIELD OF THE INVENTION

The invention relates to a combination propulsion system, hereafter simply referred to as engine, for flying speeds ranging from subsonic speeds to hypersonic speeds. Such engines or systems comprise a rocket engine section and a turbo engine section. An air turbo rocket is one type of such engines.

BACKGROUND INFORMATION

Flying craft capable of flying at hypersonic speeds, which have, for example, been investigated in the so-called "Saenger-Project" pose a substantial problem when it comes to the selection of a suitable engine. Compared to standard military aircraft and commercial aircraft, one must pay particular attention to the substantially larger range of flying speeds and the higher range of flying altitudes in combination with the corresponding variations in the environmental conditions such as pressure, temperature, and so forth. Further, such craft are expected to have a substantial flying range so that also the engine efficiency takes on a critical role.

It has been recognized heretofore that a single type of engine is not suitable for meeting all the above mentioned requirements in a satisfactory manner. As a result, combination systems with two or more different types of engines combined cannot be avoided. It is sensible to use air breathing engines for relatively low to moderate flying altitudes where a sufficient atmospheric air pressure is available because such air breathing engines can use the air oxygen as an oxidator. Turbo air jet engines have a special appeal for flying speeds in the range from subsonic to supersonic. One special type of a turbo air jet engine which is relatively independent from the environmental conditions is the so-called "air-turbo-rocket". This type of engine drives the compressor by means of a turbine which is independent of the atmospheric air. Propulsion gases from a rocket combustion chamber are admitted to the turbine for making it independent of the atmospheric air. Compared to conventional gas turbine engines the air turbo rocket is thus suitable for higher flying speeds as well as for higher flying altitudes. However, the air-turbo-rocket has a poor efficiency in the subsonic speed range.

So-called ram jets or scram jets are suitable for even higher flying speeds at altitudes where still sufficient atmospheric oxygen is available to sustain a subsonic or supersonic combustion.

For the highest flying speeds independent of atmospheric air, rocket engines are required which may be constructed as so-called mainstream rockets or bypass flow rockets. However, such rocket engines make sense only for high altitude flights, particularly in outer space because the oxidator for the rocket engine must be taken along as a ballast.

German Patent Publication (DE-PS) 3,617,915 discloses a conventional combination engine comprising a rocket engine section, a ram jet engine section, and a turbo air jet section forming a so-called "air-turbo-rocket".

The drive turbine of the compressor of the air turbo rocket serves also as the engine or drive for the fuel pumps of the rocket engine. Thus, it is necessary to provide a clutch or coupling between the turbine and the compressor for interrupting the power transmission between the turbine and the compressor during rocket operation. The turbo air jet engine section and the ram jet engine section are integrated into a common air jet engine and comprise a common flow channel for the inflowing external air. During ram jet operation the axial low pressure compressor is decoupled from its drive turbine and during this operation the compressor blades are tilted into a position in which they pose a low resistance, a so-called feathering position. The compressor thus must be equipped with adjustable compressor blades. Additionally, the compressor must be constructed with due regard to the high power transduction or throughput, with regard to the substantial size ratios and the high r.p.m.s and so forth, so that the compressor is a rather very critical structural component with regard to its material and structural strength. Additionally, due to the required adjustability of the compressor blades the structure becomes noticeably heavier compared to compressors with stationary non-adjustable blades. Due to the high power that must be transmitted between the turbine and the compressor, the respective clutch or coupling is also a critical structural component having a substantial weight. As a result, the compressor construction with adjustable blades has an adverse effect on the manufacturing costs and on the maintenance costs, not to mention the weight which reduces the payload. Besides, the complicated construction reduces the reliability.

German Patent Publication (DE-OS) 3,738,703 discloses a combination engine comprising a twin cycle gas turbine jet engine combined with a ram jet engine. In this known system the outer flow circuit of the gas turbine jet engine corresponds to the flow circuit of the ram jet engine. When the system operates as a turbo engine, the air in the outer flow circuit is accelerated by means of a fan having two rotor wheels without any guide blades or vanes and operating in opposition to each other. The drive of the two rotor wheels is accomplished by two turbines located in the inner flow circuit of the gas turbine jet engine. During ram jet operation the inner flow circuit is closed and the blades of the fans are brought into the feathering position.

Compared to the system of German Patent Publication (DE-PS) 3,617,915, the system disclosed in German Patent Publication (DE-OS) 3,738,703 does not require any clutch between the turbine and the fan. However, two fan rotor wheels are required and these wheels must be provided with adjustable blades which also leads to the same disadvantages as has been mentioned above. Further, a twin cycle gas turbine jet engine is substantially more complicated, heavier and more trouble-prone than a so-called air turbo rocket. Further, the system according to German Patent Publication (DE-OS) 3,738,703 is not operable independently of the atmospheric air. In other words, the turbo operation and the ram jet operation depend on the atmospheric air, so that such a system is not suitable for very high flying altitudes.

OBJECTS OF THE INVENTION

In view of the above it is the aim of the invention to achieve the following objects singly or in combination:
 to provide a combination propulsion system capable of operating over a wide range of flying speeds ranging from subsonic speeds to hypersonic speeds;

to combine a turbo air jet engine with a rocket drive that is independent of the atmospheric air and, if desired, to further combine into the system a ram jet engine;

to combine the two or three systems in a compact manner with reduced weight and a simple construction so as to avoid the sources of trouble or failure described above in connection with the prior art; and to simplify the construction of such a system, more specifically, to avoid the above mentioned need for adjustable compressor blades, thereby substantially reducing the structural effort and expense.

SUMMARY OF THE INVENTION

The combination propulsion system according to the invention comprises a gas generator arranged at the rocket engine section and driven by excess fuel. Valving mechanisms such as aperture shutters or rotary shutters are so arranged that the gas generator is selectively connectable through a flow mechanical connection either to a rocket combustion chamber or to a turbine group of the turbo air jet engine section. The turbine group and the compressor group each comprises several counter rotating or counter working turbine wheels without any intermediate guide wheels. Each turbine wheel forms with one compressor wheel of the turbo air jet engine section a free wheeling rotor. The turbine blades may be arranged radially inwardly or radially outwardly of the compressor blades or vanes. The exit channel of the turbine group to the combustion chamber of the turbo air jet engine section is constructed as a mechanism for mixing the turbine propulsion gases with the inflowing atmospheric air.

In the just described system according to the invention the gas generator driven by excess fuel produces the propulsion gases for the turbine group of the turbo air jet engine section during turbo operation of the so-called air turbo rocket. During rocket operation the gas generator functions as a preliminary combustion chamber of the rocket engine section. For this purpose the gas generator is equipped with two selectively operable closure or valve mechanisms.

The turbine group and the compressor group of the air turbo rocket each comprises the same number of counter operating turbine and compressor wheels without any intermediate guide wheels. One turbine wheel and one compressor wheel form a free wheeling integral rotor, whereby the turbine blades may be arranged radially inwardly or radially outwardly of the compressor wheels. This type of construction according to the invention obviates the drive shafts and bearings so that the overall weight is reduced to a minimum while simultaneously reducing the required space and the structural efforts and expenses. Due to the counter operating or counter rotating construction without any guide blades of the rotors, it is now possible to permit the compressor to operate in a so-called windmilling fashion, that is in a free wheeling manner during ram jet operation, thereby minimizing flow losses without the need for adjusting compressor blades. This construction which does not require adjustable blades in the compressor, has substantial advantages with regard to weight, strength, reliability, and structural efforts and expenses which, among other advantages, result in reduced costs.

The exit channel of the turbine group which leads to the combustion chamber of the turbo air jet engine section is constructed as a mixing device which mixes the fuel rich turbine propulsion gases with atmospheric air. After ignition of the gas-air mixture, this exit channel also functions as the flame holder.

BRIEF DESCRIPTION OF THE DRAWINGS

In order that the invention may be clearly understood, it will now be described, by way of example, with reference to the accompanying drawings, wherein:

FIG. 6 shows the flow-through or open state, while FIG. 7 shows the closed or shut-off state;

FIG. 9 is a view similar to that of FIG. 8, but showing the configuration of a second gas distributor as used in FIGS. 3, 4, and 5.

DETAILED DESCRIPTION OF PREFERRED EXAMPLE EMBODIMENTS AND OF THE BEST MODE OF THE INVENTION

Figure 1:
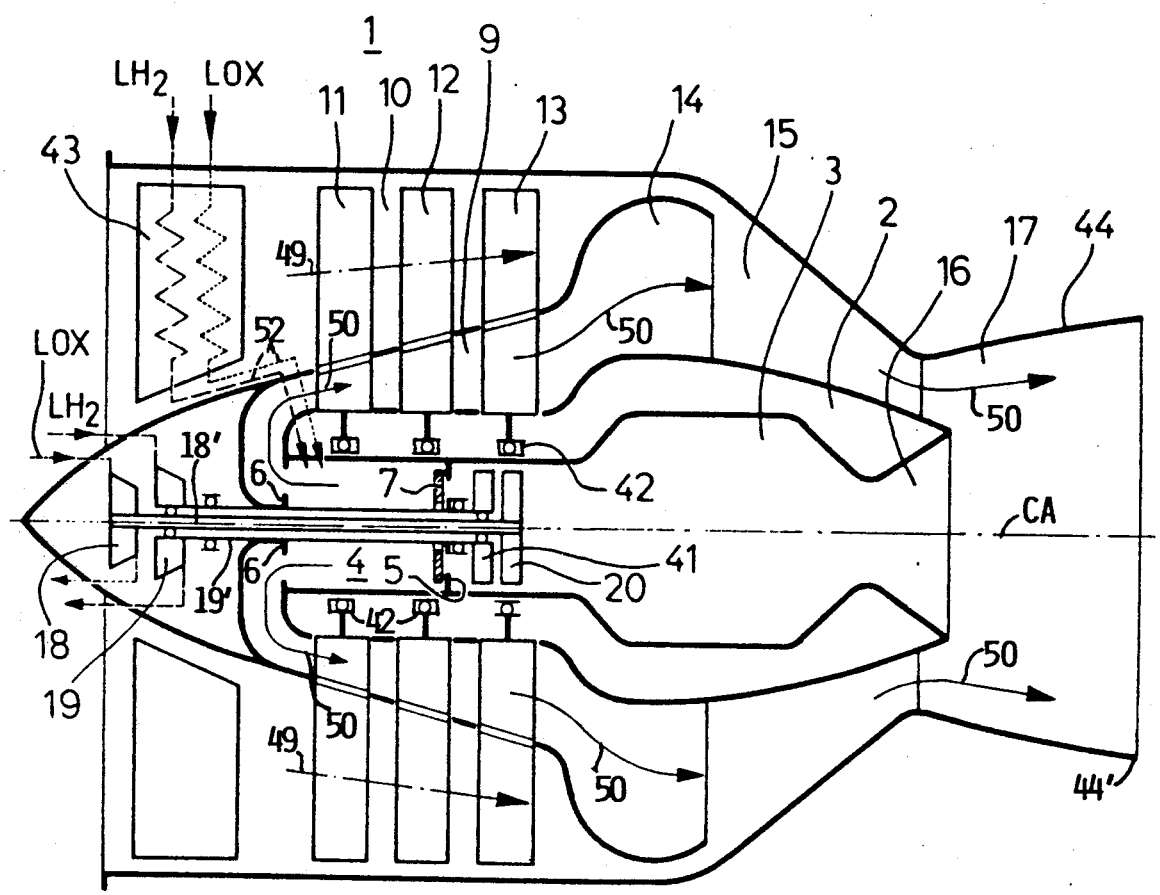
FIG. 1 shows schematically an engine or combined propulsion system according to the invention when it works as a turbo engine.
Figure 2:
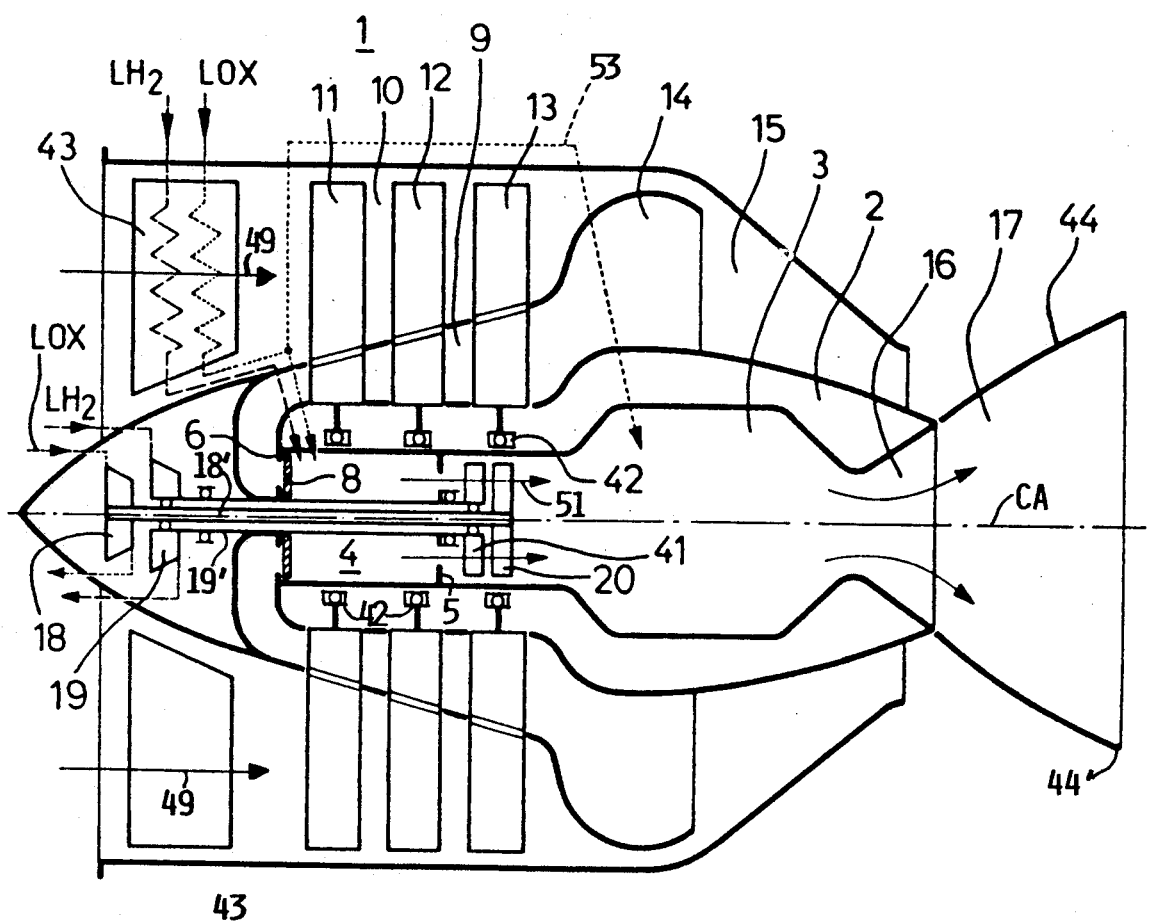
FIG. 2 shows the engine of FIG. 1 when it works as a rocket engine.
Figure 3:
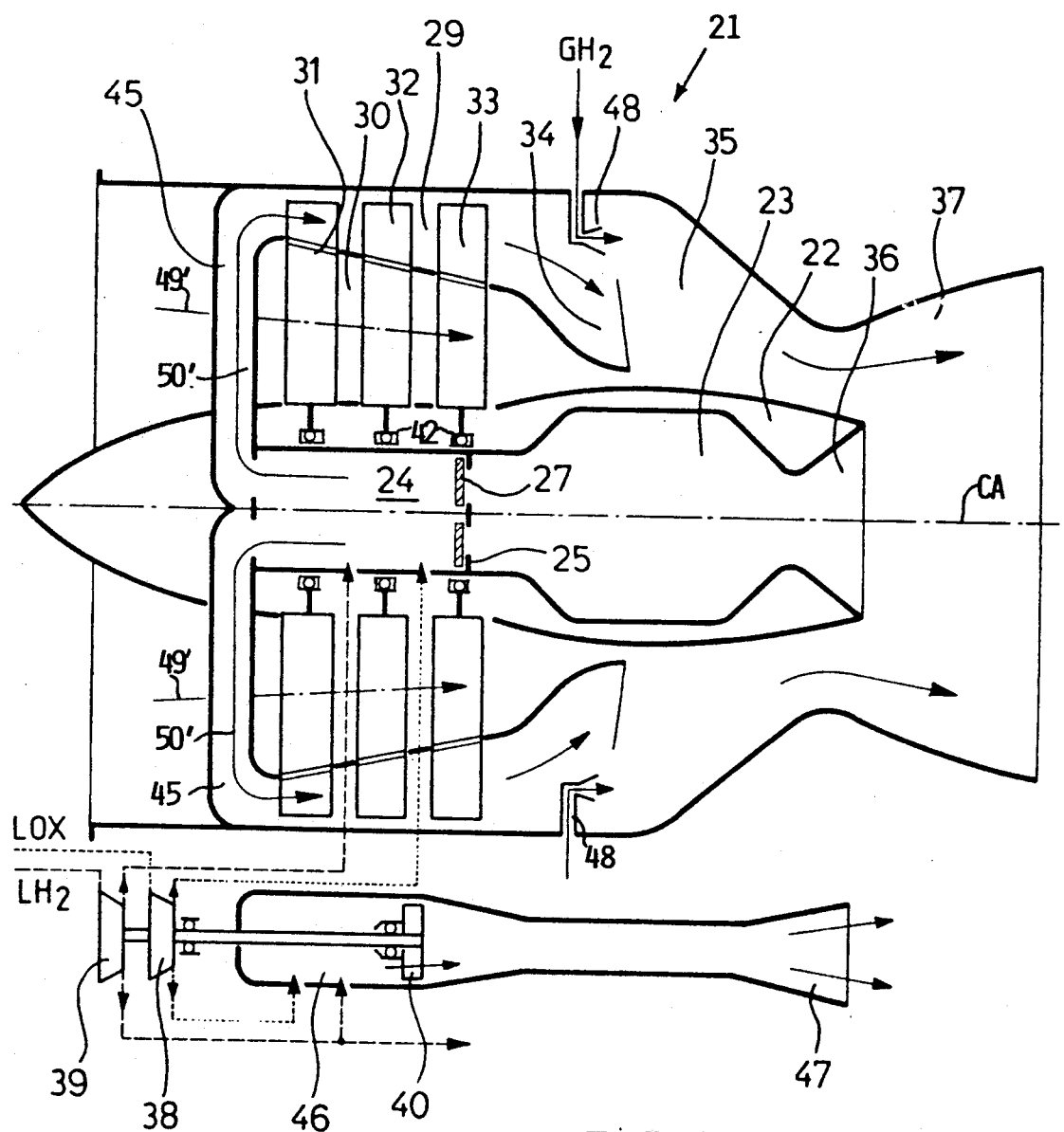
FIG. 3 illustrates a modified embodiment of the combined propulsion system or engine according to the invention operating as a turbo engine.
Figure 4:
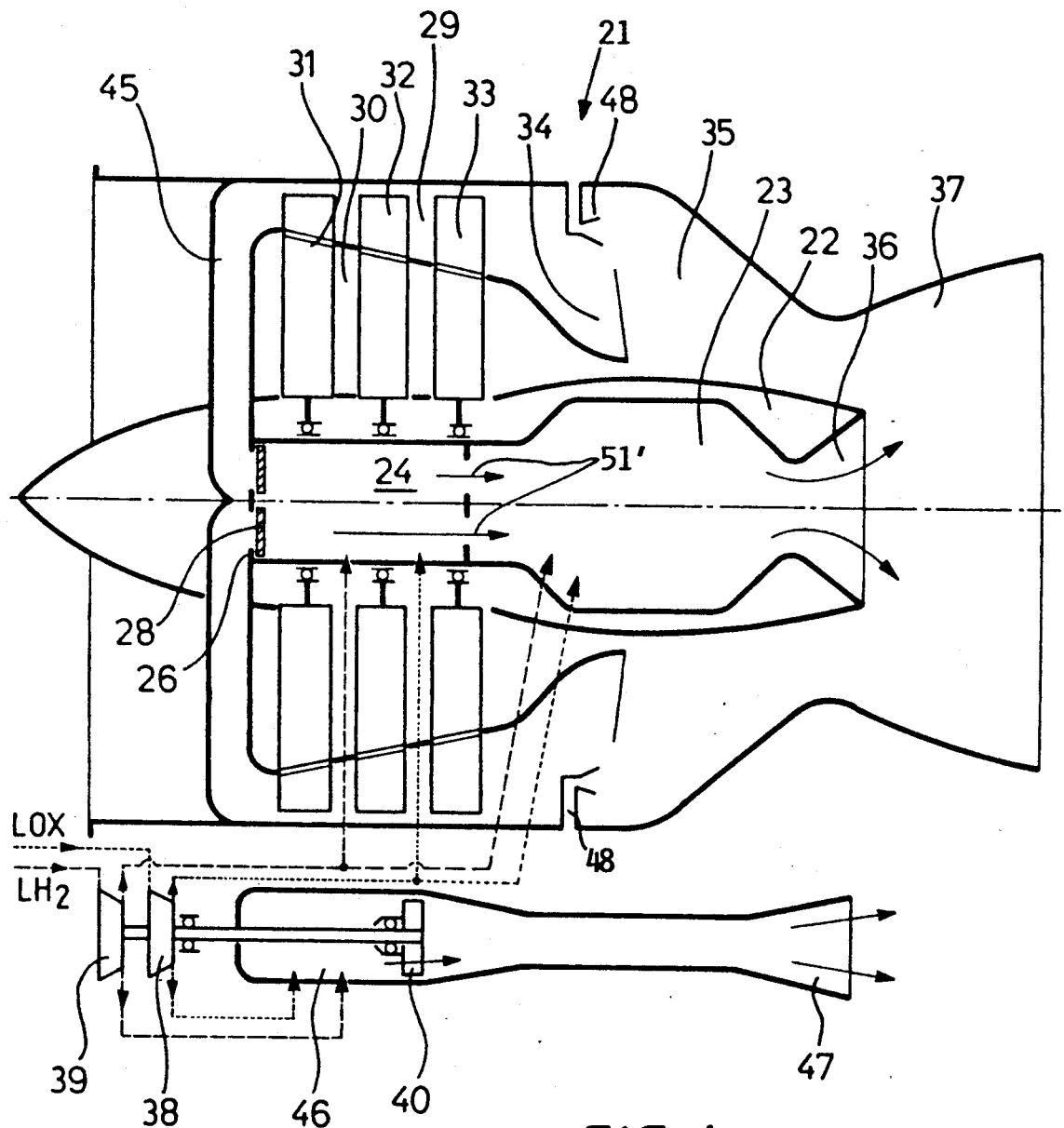
FIG. 4 shows the engine of FIG. 3 operating as a rocket engine.
Figure 5:
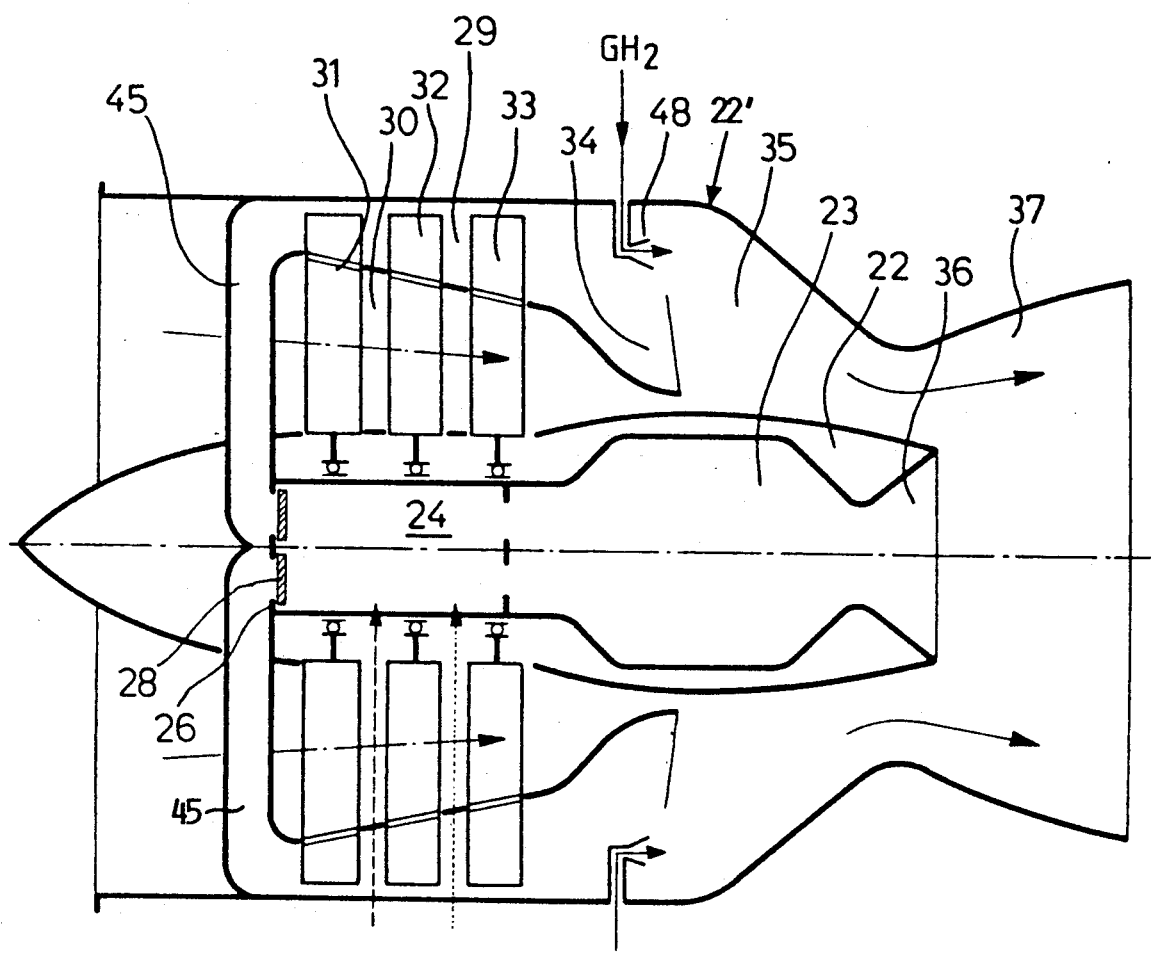
FIG. 5 is a view similar to that of FIG. 4 illustrating the engine components participating in a ram jet operation.

The combination engine according to the invention comprises at least one rocket engine 2 independent of atmospheric air and a turbo air jet engine 1 constructed as a so-called air turbo-rocket, as shown in FIGS. 1 and 2. In a further embodiment of the invention the two just mentioned engines are supplemented by a third engine constructed as a ram jet integrated with the two first mentioned engine types, as shown in FIGS. 3, 4, and 5. The ram jet section utilizes the same flow channel as the turbo air jet engine. Both, the ram jet and the turbo engine sections depend on atmospheric air and use the same structural components as far as the inlet structure, the compressor structure, the combustion chamber, and the thrust nozzle are concerned. The ram jet, however, requires a special construction of the air inlet in the form of a diffuser effective in the subsonic, as well as in the supersonic range. An air inlet that is adjustable throughout a wide range is best adaptable to the requirements of both types of operation. It is further important that the turbo compressor, which is freewheeling during the ram jet operation, does not cause any excessive flow, and thus compression losses. Another requirement for the ram jet operation involves the presence of a fuel supply mechanism in the zone of the common turbo/ram jet combustion chamber.

Referring to FIGS. 1 and 2 showing one embodiment of a combination engine 1 according to the invention, the main flow engine is constructed as a rocket engine 2 which means that the turbine propulsion gases which are needed for driving the fuel pumps 18 and 19, flow through the rocket combustion chamber 3 and through the thrust nozzle 16 and thus contribute directly to the thrust generation. A twin shaft connects the fuel pumps with the respective turbines. Specifically, the turbine 20 drives the fuel pump 18 through the inner shaft 18'. The turbine 41 drives the fuel pump 19 through the outer shaft 19'. However, this structure is not critical. Instead of the two turbines 20 and 41, the pumps could be driven by a single turbine.

Figure 6:
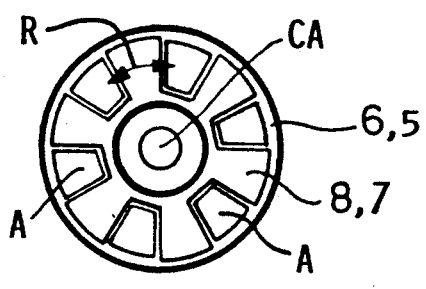
FIGS. 6 and 7 show a valving mechanism for switching the present engine from a turbo operation to a rocket operation or vice versa, whereby
Figure 7:
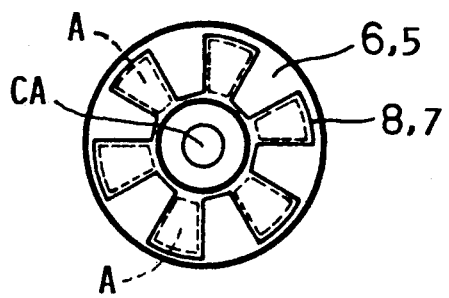

According to the invention a gas generator 4 performs a double function. During rocket operation, shown in FIG. 2, the gas generator 4 functions as a precombustion chamber for the rocket engine 2 and supplies the propulsion gases for the turbines 20 and 41 which drive, as mentioned, the fuel pumps 18 and 19. Fuel pump 18 provides liquid oxygen (LOX) into the rocket combustion chamber 3 and into the gas generator (4). Fuel pump 19 provides liquid hydrogen (LH$_2$) into the gas generator 4, whereby the gas generator 4 operates with excess fuel (LH$_2$) so that for the stoichiometric combustion liquid oxygen (LOX) must be injected into the rocket combustion chamber 3. The gas generator 4 comprises two valving mechanisms 5, 7, and 6, 8. The valving mechanism 5, 7 is located at the exit end of the gas generator 4, while the valving mechanism 6, 8 is located at the front end of the gas generator 4. The valving mechanisms may be constructed, for example, as an aperture shutter with stationary apertured elements 5 and 6 cooperating with rotatable slide shutters 7, and 8, respectively. FIGS. 6 and 7 show such a valving mechanism, whereby the view direction is along the central axis CA from the rocket combustion chamber 3 in the forward direction. The rotary slide shutters 7, 8 are rotatable as indicated by the arrow R in FIG. 6 illustrating the open position in which propulsion gases can flow through the apertures A in the stationary elements 5, 6. FIG. 7 shows the closed position, wherein the apertures A are closed by the slide shutters 7, 8. Incidentally, the valving mechanisms 25, 27 shown in FIG. 3 and 26, 28 shown in FIGS. 4 and 5 are of the same construction as just described with reference to FIGS. 6 and 7. In all embodiments the rotary slide shutters 7, 8 or 27, 28 are rotated around the central axis CA to thereby open or close the apertures A in the respective stationary element 5, 6 or 25, 26. The apertures A are distributed circumferentially around the respective stationary element of the shutter, whereby lands and apertures alternate around the stationary element. However, other valving mechanisms could be used, for example, those of the type that operate in the manner of an adjustable guide vane grating. For this purpose, the valving mechanism would comprise a plurality of flaps tiltable around radial axes. These flaps can be adjusted to be aligned with the flow direction when the mechanism opens. In the closed position the flaps extend across the flow direction.

For the turbo operation shown in FIG. 1, the valving mechanism 5, 7 between the rocket combustion chamber 3 and the gas generator 4 is closed and the valving mechanism 6, 8 near the front end of the gas generator 4 is open, whereby the gases generated in the generator 4 exit at the front end of the gas generator 4 and turn by almost 180° to enter into the turbine group 9 as indicated by the arrows 50.

For the rocket operation shown in FIG. 2, the rearward valving mechanism 5, 7 is open and the forward valving mechanism 6, 8 is closed, whereby gases generated in the gas generator 4 exit as indicated by the arrows 51 from the gas generator 4 to enter into the rocket combustion chamber 3.

Referring further to FIGS. 1 and 2, the turbine group 9 is arranged radially inwardly within the compressor group 10. The arrangement is such that one turbine wheel and one compressor wheel are combined on a free wheeling rotor, whereby, for example, three such rotors 11, 12, and 13 are mounted by antifriction bearings B on the housing of the gas generator 4. Incidentally, the shafts 18' and 19' are also supported by respective antifriction bearings. The blades of the turbine wheels forming the turbine group 9 and the blades of the compressor wheels formin the compressor 10 which together form the rotors 11, 12, and 13, are mounted in fixed positions and are so oriented that neighboring rotors rotate in opposite directions. Guide blade rings between the rotors 11, 12, and 13 are altogether avoided. However, it may be useful to provide guide vanes upstream of the turbine group 9 and/or downstream of the compressor group 10. The main advantages of the turbine compressor construction according to the invention are seen in the integral compact arrangements of the components, in the counter rotating operation of the rotors, and in the avoidance of guide blade rings, whereby the weight of the entire structure is substantially reduced, and the required space is optimally small while simultaneously assuring small mechanical losses as well as relatively small flow losses due to the windmilling or free wheeling operation during idling.

In the turbo operation shown in FIG. 1, the gases 50 exit from the turbine group 9, enter into the fuel enriched propulsion gases in the sector gas distributor 14 for mixing external air with these fuel enriched propulsion gases to achieve a complete stoichiometric combustion in the combustion chamber 15 of the turbo engine 1. The combustion chamber 15 of the turbo engine 1 surrounds the combustion chamber 3 of the rocket engine 2 in a concentric manner. The external air flow is indicated by the dash-dotted arrows 49.

Figure 8:
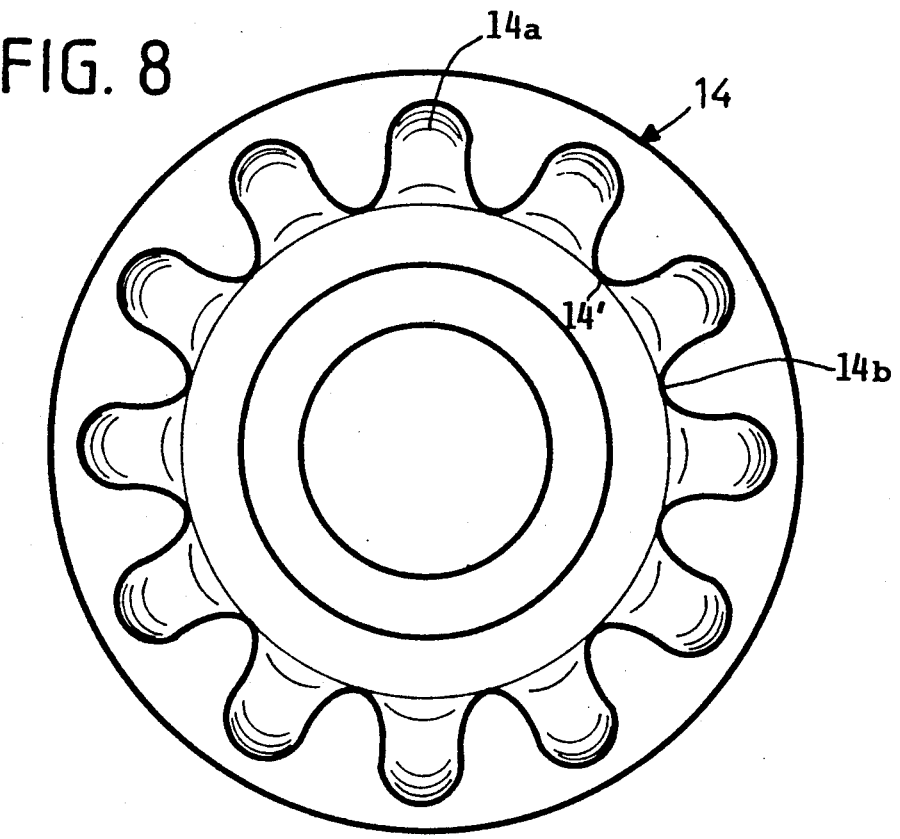
FIG. 8 is a view into the engine in a direction opposite to a turbo gas flow in FIGS. 1 and 2 to show the configuration of a first gas distributor embodiment.

The view of FIG. 8 is against the flow direction and illustrates the sector gas distributor 14 which is arranged directly downstream of the circular turbine exit of the rotor 13 and opens rearwardly in the flow direction 50. The wall structure 14' of the distributor 14 is curved in the flow direction and corrugated in the circumferential direction. This corrugation in the circumferential direction results in a wavy cross-section of the distributor 14 as shown in FIG. 8 so that in the radial direction valleys 14a and ridges 14b alternate with each other. As a result, and as viewed in the axial direction, the contour of the distributor 14 resembles that of a gear wheel or of flower petals. The distributor 14 performs several functions simultaneously, namely in addition to mixing the air with the gases, it functions as a flame holder and it forms the forward boundary of the combustion chamber 15. The exhaust gases 50 of the combustion chamber 15 exit through the convergent-divergent thrust nozzle 17 during turbo operation. The divergent portion 44 of the thrust nozzle 17 may be constructed to have an adjustable cross-sectional flow area. For this purpose, the nozzle 17 is, for example, constructed of a plurality of nozzle segments which are tiltable about a pivot point 44'. For the turbo operation the nozzle sections 44 are located as shown in FIG. 1. For the rocket operation the nozzle sections 44 are located as shown in FIG. 2. Thus, during the rocket operation the nozzle sections 44 lengthen the thrust nozzle 16 of the rocket engine 2, thereby improving the flow dynamic characteristics by increasing the expansion ratio of the thrust nozzle 16 at high flight altitudes.

During rocket operation at medium flight altitudes with a higher atmospheric pressure, it is sufficient to keep the nozzle sections 44 in the position shown in FIG. 1 because the shorter nozzle 16 achieves a sufficient gas expansion at medium altitudes. Thus, for rocket operations at medium altitudes, the nozzle 17 of the turbo engine, can remain as open as it is shown in FIG. 1 for the turbo operation, in order to increase the thrust of the rocket jet by mixing external air into the rocket jet in an ejector type of operation.

During ram jet operation the gas generator 4 is switched off and the rotors 11, 12, and 13 rotate in a windmilling type of operation, that is, they are idling. Fuel is introduced in the zone of the sector gas distributor 14, preferably as a gaseous fuel which is combusted with the ram air in the combustion chamber 15.

Since the turbines 20 and 41 operate only during rocket operation, it is necessary to provide an additional fuel supply system for the turbo and ram jet operation. In this connection it may be sufficient to equip the fuel pumps 18 and 19 with a freewheeling mechanism and/or with additional drive motors not shown.

An air cooler 43 is arranged so that the cryogenic fuels, namely the liquid oxygen (LOX) and the liquid hydrogen (LH$_2$), flow at least partially through this air cooler 43 for cooling the inflowing external air, thereby further compressing this air and increasing the mass flow of the incoming air. The thereby heated fuel flows are supplied directly to the gas generator 4 as indicated by dotted lines 52 and/or other fuel consuming components of the system, such as the rocket engine 3 and indicated by the dotted line 53 in FIG. 2. As mentioned, the incoming air is indicated by the arrow 49.

FIGS. 3 and 4 show another embodiment according to the invention in which the combination engine 21 differs from the engine 1 of FIGS. 1 and 2 in several respects. First, the rocket engine 23 of FIGS. 3 and 4 differs from that of FIGS. 1 and 2. Second, the compressor/turbine group of the second embodiment also differs from that of FIGS. 1 and 2. Third, the fuel pumps in FIG. 3 are driven by a separate turbine 40 outside the gas generator.

The rocket engine 22 of FIGS. 3 and 4 is constructed as a so-called bypass flow engine. In such a construction, the propellant gases for the turbine 40 for driving the fuel pumps 38 and 39 are generated in a separate gas generator 46 and additionally accelerated in a small thrust nozzle 47.

According to the invention a further gas generator 24 is mounted concentrically in the engine combination of FIGS. 3 and 4. The gas generator 24 functions as a precombustion chamber for the combustion chamber 23 of the rocket engine 22. Additionally, the gas generator 24 functions as a propellant gas generator for the turbine group 29 of the air-turbo-rocket. The valving mechanisms 25, 27; 26, 28 are quite similar as the respective mechanisms in FIGS. 1 and 2 and as illustrated in FIGS. 6 and 7. More specifically, the stationary apertured elements 25, 26 cooperate with rotational shutter elements 27 and 28 as described above. Other types of conventional valving mechanisms could be employed in FIGS. 3 and 4. During the turbo operation illustrated in FIG. 3, the valving mechanism 25, 27 is closed while the valving mechanism 26, 28 is open, so that the propellant gases from the gas generator 24 pass through several gas conduits 45 to the outer circumference of the rotor 31 as indicated by the arrow 50'.

The turbine group 29 is located radially outwardly of the compressor group 30, whereby the integral connection between the turbine blades and the compressor blades as taught by the invention is also assured. In other words, the invention employs the known principle of the so-called "tip mounted turbine", whereby it is possible to increase the turbine torque moment even with a limited propellant gas energy. Neighboring rotors of the rotors 31, 32, and 33 also work in opposite directions as in FIGS. 1 and 2, without any intermediate guide blade rings so that each rotor is freely rotatably supported independently of the other rotors by individual antifriction bearings 42, for example, mounted around the housing of the separate gas generator 24.

A sector gas distributor 34, shown in FIG. 9, is arranged immediately downstream of the circular turbine outlet next to the rotor 33 and has a corrugated inner contour with radially inwardly reaching valleys 34a and radially outwardly reaching ridges 34b. The distributor 34 restricts the air flow cross-sectional area at regular angular intervals more or less in a radially inward direction. The distributor 34 also forms the upstream end of the combustion chamber 35 of the turbo engine section. The combustion chamber 35 merges into the convergent-divergent thrust nozzle 37 which may be adjustable as in FIGS. 1 and 2.

A plurality of fuel injection nozzles 48 are arranged around the circumference of the engine housing to inject additional fuel into the combustion chamber 35 near the sector gas distributor 34, preferably gaseous hydrogen (GH$_2$) is injected through the nozzles 48 as additional fuel. Incidentally, such additional fuel injection nozzles may also be provided at the respective location in the embodiment shown in FIGS. 1 and 2. The fuel distribution shown in FIGS. 3 and 4 permits a parallel operation of the rocket engine 22 and of the turbo air jet engine 22'. For this purpose the gas generator 24 is closed toward the combustion chamber 23 of the rocket engine 22 by the valving mechanism 25, 27 as shown in FIG. 3 while the valving mechanism 26, 28 is open for delivering the propulsion gases to the turbine group 29 as indicated by the arrow 49'. Simultaneously, the fuel pumps 38, 39 deliver liquid oxygen (LOX) and liquid hydrogen (LH$_2$) into the combustion chamber 23 in a stoichiometric ratio. In this type of parallel operation the rocket engine 22 operates without any precombustion chamber.

A parallel operation of a ram jet engine with a rocket engine is possible in both embodiments of the invention as illustrated in FIGS. 1 and 2 on the one hand, and FIGS. 3 and 4 on the other hand. For this purpose, it is necessary to provide an additional fuel supply in the zone of the sector gas distributor 14 in the first embodiment and of the gas distributor 34 in the second embodiment. The nozzles 48 shown in FIG. 3 are suitable for this purpose. In that case, the rocket engines operate with a precombustion chamber. Thus, the valving mechanism 25, 27 would be open and the valving mechanism 26, 28 would be closed to permit gas flow in the direction of the arrow 51' as shown in FIG. 4, whereby the gas generator chamber 24 functions as a precombustion chamber to the combustion chamber 23.

The air cooler 43 illustrated in FIGS. 1 and 2 may also be provided in the embodiment of FIGS. 3 and 4. Furthermore, the two types of turbine compressor constructions can be combined with any of the rocket engines illustrated in the first and second embodiments.

FIG. 5 illustrates the operation of the second embodiment as a ram jet engine. For this purpose, gaseous hydrogen is supplied through the fuel injection nozzles 48 into the combustion chamber 35 and the valving mechanism 26, 28 closes the second gas generator 24 toward the ducts 45.

Although the invention has been described with reference to specific example embodiments it will be appreciated that it is intended to cover all modifications and equivalents within the scope of the appended claims.

What I claim is:

1. A combination propulsion system for a flying craft capable of flying at speeds within the range of subsonic speeds to hypersonic speeds, comprising a rocket engine section, a turbo air jet engine section coaxially surrounding said rocket engine section, said turbo air jet engine section including a compressor and at least one turbine independent of external atmospheric air, gas generator means (4, 24) operable with excess fuel for generating combustion gases, two valving mechanisms for controlling gas flow out of said gas generator means, said valving mechanisms being controllable for selectively providing a flow mechanical connection to a rocket combustion chamber (3, 23) or to said turbine of said turbo air jet engine section, said turbine and said compressor of said turbo air jet section each comprising several counter-rotating running wheels without any intermediate guide wheel, wherein each running wheel of said turbine forms with one running wheel of said compressor of said turbo air jet engine section a free wheeling rotor, and wherein said turbo air jet engine section comprises a turbo combustion chamber and gas distributor means leading from said turbine and compressor to said turbo combustion chamber of said turbo air jet engine section for mixing turbine propellant gases with inflowing outside air.

2. The propulsion system of claim 1, wherein said running wheels of said turbine have turbine blades and said running wheels of said compressor have compressor blades, said turbine blades being arranged radially inwardly of said compressor blades.

3. The propulsion system of claim 1, wherein said running wheels of said turbine have turbine blades and said running wheels of said compressor have compressor blades, said turbine blades being arranged radially outwardly of said compressor blades.

4. The propulsion system of claim 1, further comprising extra fuel supply means (48) for operating said turbo air jet engine section as a ram jet, whereby an inlet, said compressor, said turbo combustion chamber, and a thrust nozzle are provided in common for both types of operation.

5. The propulsion system of claim 1, wherein said gas generator means are arranged in axial alignment with said rocket engine section and coaxially with said turbo air jet engine section.

6. The propulsion system of claim 1, wherein said turbo air jet engine section comprises a first thrust nozzle (17) having a convergent portion and a divergent portion, and wherein said rocket section comprises a second thrust nozzle (16), said divergent portion (44) of said thrust nozzle (17) of said turbo air jet engine section comprising means (44') for varying the cross-sectional flow area of said divergent portion (44), whereby for a minimal entrance diameter of said divergent portion (44) said divergent portion cooperates with an exit cross-sectional area of said second thrust nozzle (16) of said rocket engine section (2) in such a way that the rocket engine thrust nozzle (16) is elongated in a flow mechanical manner for a selective operation at high altitudes when using said rocket engine section independently of atmospheric air.

7. The propulsion system of claim 4, wherein said gas distributor means (34) and said extra fuel supply means comprise nozzles (48) arranged to provide a mixing area for turbine propellant gases with external air for a ram jet operation.

8. The propulsion system of claim 7, wherein said mixing area is located in an exit channel of said turbine of said turbo air jet engine section, said nozzles (48) being arranged in radial alignment opposite valleys (34a) in said gas distributor means (34) for a ram jet operation.

9. The propulsion system of claim 1, further comprising at least one air cooler means (43) arranged for a through flow of cryogenic fuel means, said air cooler means being located upstream of said compressor of said turbo air jet engine section.

10. The propulsion system of claim 1, wherein said rocket engine section (2) is constructed as a main flow engine, whereby at least one turbine is arranged in a flow channel from said gas generator means (4) to a rocket combustion chamber (3) for driving fuel pumps (18, 19) for a rocket operation.

11. The propulsion system of claim 1, wherein said rocket engine section (22) is constructed as a bypass flow engine, said system comprising a further gas generator means (46) for driving a turbine means (40) for operating fuel pumps (38, 39), said further gas generator means being driven by partial flows of propellant fuels.

* * * * *